United States Patent Office 3,007,827
Patented Nov. 7, 1961

3,007,827
CRESYLIC ACID RESIN-POLYAMIDE LAMINATE
Maria Honnen, Oak Park, Ill., assignor to The Richardson Company, Melrose Park, Ill., a corporation of Ohio
No Drawing. Original application Apr. 27, 1956, Ser. No. 581,252, now Patent No. 2,930,774, dated Mar. 29, 1960. Divided and this application Oct. 15, 1958, Ser. No. 773,127
11 Claims. (Cl. 154—43)

This application is a division of application Serial Number 581,252, filed April 27, 1956, now Patent No. 2,930,774.

This invention is concerned with new and improved laminates and also with varnishes used in forming such laminates.

Industrial or synthetic laminates have, for a number of years, been formed by first impregnating a base material or filler such as paper, fabric, etc. with phenolic type resins. Subsequently, a plurality of sheets of impregnated stock are stacked and subjected to heat and pressure, resulting in the formation of a hard, dense, board-like product.

Laminates of this type have found wide-spread use in the manufacture of electrical apparatus such as radios, television, and the like, wherein, for example, circuit components are attached to the laminate as a supporting medium and joined by wiring. As a result of using synthetic laminates in the manufacture of electrical apparatus, special attention has been given to their electrical properties and also their fabricating properties.

Thus, it has become increasingly important that a synthetic laminate have improved insulation resistance, arc resistance, etc., all termed electrical properties. Additionally, enhanced physical properties are also in demand, such as flexural strength and punchability. This latter property is of particular concern in connection with the formation of holes in the laminate or otherwise fabricating the laminate for a particular end use.

Heretofore it has been the practice to add certain plasticizers to the phenolic resin used to impregnate the filler or base material, thereby enabling the laminate to be more easily perforated or punched. Plasticizers such as dibutylphthalate, tri-cresyl phosphate and china wood oil are commonly employed for this purpose. In some instances, to fabricate laminate made from compositions containing such plasticizers, it may be necessary to preheat the laminate up to a temperature of 150° F. or above before introducing it into a punch press, a not particularly desirable step from either a time or cost viewpoint. In other cases, while the plasticizer may permit the laminate to be punched or fabricated at or near room temperatures, the presence of the plasticizer results in a reduction of electrical properties. Also, in other cases the plasticizer may be somewhat volatile even at or near room temperatures whereby its evaporation will change the characteristic of the laminate in which it is used.

Further, certain of the foregoing plasticizers are somewhat volatile at elevated temperatures resulting in a loss of plasticizer, especially during the intermediate drying of the saturated filler or base material. Hence, a change in characteristics of the laminate will result when plasticizer is removed. Additionally, when laminates are heated before punching shrinking problems occur, often causing changes in dimensions of punchings unless allowances are made in the design of fabricating tools.

Accordingly, it is one of the objects of this invention to produce a synthetic laminate having improved fabricating or punching properties.

Another object is the provision of a laminate which may be fabricated or punched at normal or room temperatures and which has properties at least equivalent to those of similar grade laminates currently available.

A further object is to provide a varnish which may be used to form laminates of the foregoing type.

A still further object is to provide a method of making the above laminates.

These and other objects will become evident from the description of the invention presented herein.

It has been discovered that enhanced fabricating and punching properties of a laminate can be attained if the laminate is formed using a particular type of varnish. The varnish contemplated comprises a combination of a special cresylic acid-formaldehyde resin and a polyamide.

The cresylic acid employed should be one wherein the amount of m-cresol is not less than 30 percent, the amount of free phenol not more than about 4 percent and 3,5 and/or 3,4 xylenols (high boiling) not present in quantities greater than 12 percent of the total quantity of cresylic acid, the percentages given being by weight.

Higher percentages of free phenol will result in the formation of undesirable quantities of phenol-formaldehyde which, in the presence of polyamides, will give a fast reacting varnish at room temperature rendering the same generally unsuitable for use in making laminates. Similarly the presence of 3,5 or 3,4 xylenols in amounts above 12 percent will likewise give relatively fast reacting varnishes unsuitable for use in laminating processes. Such xylenols cause difficulty, especially during the intermediate drying of an impregnated filler. When such fast reacting varnishes are used to impregnate filler sheets of laminates, they set-up during preliminary processing and before the sheets can be properly stacked and subjected to the desired cure under heat and pressure. This precuring poses problems not only in processing but also in uniformity of the laminate.

In order to obtain the high electrical properties required of laminates for present day use, it is necessary that a certain amount of cross-linking of components of the varnish take place. Correspondingly, to provide for cross-linking it is essential that at least a minimum amount of components be present which are capable of entering into a cross-linking reaction. In this connection it has been found that the desired results are obtained if a cresylic acid is used containing not less than about 30 percent of m-cresol. Below this amount, there is a reduction in the electrical properties of the final laminate due to lack of cross-linking.

A typical cresylic acid which may be used in forming the varnishes of the present invention is as follows, the percentages given being on a weight basis:

| | Percent |
|---|---|
| Phenol | 2.6 |
| O-cresol | 2.3 |
| m-p Cresol | 67.5 |
| Xylenols (low boiling) | 26.5 |
| 3,5-3,4 xylenols | 1.1 |
| | 100.0 |

The amount of m-cresol in the m-p cresol of the above formulation was slightly more than 50 percent.

In preparing the cresylic acid resin, the cresylic acid is reacted with formalin in the presence of a catalyst such as ammonium hydroxide, sufficient formalin being added to provide a slight excess of formaldehyde over that theoretically required. A molar ratio of about 1.25 cresylic acid to 1 of formaldehyde is preferably used. The mixture is brought to a boil and refluxed for approximately an hour at a temperature of about 98° C. After refluxing, the water of reaction is decanted along with part of the excess formaldehyde. The solution is heated until the desired viscosity is attained and, simultaneously, the remaining formaldehyde is distilled off until the free formaldehyde is reduced to about 1.5 percent or below. Stearic acid, in minor amounts, is added to the solution for the purpose of aiding plate release after the laminating operation has been completed. Alcohol is then added to the solution to stop the reaction.

It is an important aspect of this invention that the free formaldehyde in the cresylic acid resin be present in amounts of about 1.5 percent or less of the cresylic acid resin, by weight. If free formaldehyde is present in higher amounts, it will cause rapid curing of the final varnish containing polyamide at room temperature, thus rendering it unsuitable for further processing.

The polyamides which form the second major component of the varnish of the present invention are those which may be made, for example, from a reaction of a diamine with a dicarboxylic acid. A typical example of a polyamide which may be used in accordance with the present invention is one obtained by a reaction between ethylene diamine and a polymerized fatty acid, such as dilinoleic acid. A polyamide of this type is sold by General Mills as Polyamide 100 or, more recently, as Versamid 100, the same being further described in the publication of General Mills entitled "Versamid Technical Bulletin 11–A," copyright 1955. Other polyamides may also be employed such as those formed by reacting dicarboxylic acids, i.e. adipic, sebacic, with diamines, for example tetra methylene diamine, ethylene diamine and other polyamines such as diethylenetriamine.

In combining the cresylic acid-formaldehyde resin and the polyamide to produce a varnish suitable for making a laminate having room temperature punching qualities, sufficient polyamide should be added so as to comprise more than half of the composition and, preferably, between 55 to 70 percent of the total solids content of the varnish by weight. If less than 55 percent of polyamide is present, the resulting laminate cannot be satisfactorily punched at normal or room temperatures, which generally are understood to be between 75 to 80° F. When the polyamide component is present in amounts above 70 percent, the resulting laminate will usually be too soft and, hence, unsuitable for use as a supporting board for electrical components. Additionally, if higher amounts of polyamide are present the varnish becomes tacky, resulting in processing problems, involving the impregnated filler.

For certain specialized applications it may be desirable to use less amounts of polyamide than required to produce a laminate capable of being punched at room temperature. Thus, in that situation wherein the laminate will be employed to support relatively heavy electrical components, the plasticizing effect of more than 50 percent polyamide may cause the laminate to deform. To overcome this tendency more cresylic acid resin should be present and less polyamide. However, when the quantity of polyamide is reduced to 50 percent or below it rapidly loses its cold punching or room temperature punching properties and, hence, must be heated before adequate punching can be performed.

If a blend of about 50-50 is used it has been found that the resulting laminate must be heated to approximately 100°–110° F. to obtain adequate punching or fabrication of the laminate. There is, however, no loss of polyamide, at such temperatures or even higher thereby maintaining the properties of the laminates substantially constant. Laminates having good punching qualities at temperatures up to 150° F. can, accordingly, be made by thus increasing the amount of cresylic acid resin in the polyamide blend.

In view of the fact that even small amounts of free formaldehyde in the varnish will react with the polyamide at room temperature resulting in a precure of the varnish, it has been found advantageous to add to the varnish a "stabilizer" such as m-phenylene-diamine, generally less than one percent.

While the compound m-phenylene-diamine has been termed a "stabilizer" it actually has another, and equally important function as determined by the results achieved, although the theory of its second function is not clearly understood at the present time. In general, it has been found that without the presence of the "stabilizer" the moisture absorption properties of a molded laminate tend to rise above one percent resulting in a marked decrease in insulation resistance. Further, when the stabilizer is omitted from the impregnating varnishes of the present invention, the cold flow properties of the laminate are higher, of the order of 11 percent as compared to a cold flow of around 4 percent when the "stabilizer" is present. It is believed that the second function of the stabilizer is that of a cross-linking agent for the components of the resin which is activated during the molding operation, although it is not intended that this theory be limiting.

In general it has been found that stabilizers which are aromatic diamines or certain derivatives thereof are to be preferred, an additional example being p-p methylene-di-aniline. However, polyisocyanates such as 2,4 tolylene diisocynate have also been found to function satisfactorily.

The following composition illustrates a varnish made in accordance with the principles of this invention:

|  | Percent |
|---|---|
| Polyamide (GM No. 100) | 25.5 |
| Cresylic acid resin | 16.9 |
| m-Phenylene diamine | .5 |
| Solvent | 57.1 |
|  | 100.0 |

The cresylic acid resin is the same as that given in the prior example and the polyamide is the reaction product of ethylene diamine and dilinoleic acid. The solvent is a methylethyl ketone toluene mixture.

Due to the physical nature of the varnishes produced by the present invention they are in general not suitable for directly impregnating certain common base materials or fillers such as paper, fabric, etc., that is if such base materials are made of, for example, cotton fibers having a high percentage of alpha cellulose. However, the present varnishes can be used to directly impregnate a glass cloth filler or similar filler whose fibers do not have appreciable pores or capillaries.

When using a cotton fiber filler it is necessary, in order to achieve a thoroughly saturated stock, to first impregnate the filler with what may be termed a "penetrating" varnish comprising, in the main, a substantially straight phenol-formaldehyde resin. Such a varnish can readily penetrate the pores and capillaries common to a cotton base filler and completely saturate the same. The filler, upon being impregnated with phenol-formaldehyde, is then dryed so that the resin attains almost the C stage and has a very low volatile content, of the order of one percent, the drying temperature being about 310° F. The penetrating resin should comprise between 10 and 30 percent by weight of the impregnated filler. If the phenol formaldehyde resin is present in higher quantities than 30 percent it will usually result in an excessively hardened laminate which will not fabricate or punch in the manner desired. When less than 10 percent phenol-formaldehyde is used, the pores and capillaries of the cotton fibers are not completely filled, thereby tending to increase the moisture absorption properties of the laminate and, hence, decrease the electrical properties under humid conditions.

After this preliminary treatment, the cotton base filler can then be coated with the cresylic acid resin-polyamide varnish herein disclosed which, upon subsequent curing, forms a continuous resinous binder with the preliminary phenol-formaldehyde resin.

The filler, following the second coating operation, is then passed through a drying oven or chamber at a temperature of approximately 250° F. The drying conditions, i.e., speed and temperature, may be varied to a certain extent. Thus, the speed of the saturated filler through the oven may be decreased if the temperature is lowered and vice versa. Such a drying operation removes volatiles from the resin and advances its state of cure up to approximately the beginning of the B stage.

In order to form a dense board-like laminate, a plurality of filler sheets, impregnated and dried as indicated above, are stacked in a pile and inserted between opposing platens of a hydraulic press. While in the press, the pile is subjected to an elevated temperature, generally between 300°–320° F., and a pressure of about 1200 pounds per square inch for approximately 90 minutes. Such curing conditions can be varied to some extent as will be understood by those familiar with the laminating art.

In an exemplary process of the present invention Hercules 10 mil alpha cellulose paper was first saturated with Bakelite 17913, a straight phenol-formaldehyde resin, followed by passing the stock through a drying oven at 310° F. The product had a resin content of 22.2 percent based on the total weight of resin plus paper and a volatile content of 1.05 percent. This saturated filler was then coated with the cresylic acid resin-polyamide varnish cited hereinabove in the example. Following the second coating operation the filler was passed through a drying oven at a temperature of 250° F. until the volatile content was reduced to 2.26 percent. The resin content at this stage based on the total weight was 64.2 percent.

After coating, a six sheet build-up was placed in a press and subjected to a temperature of 316° F., under a pressure of 1200 p.s.i. for 90 minutes. The resulting board-like laminate, 1/16 of an inch thick, had an insulation resistance of 164,000 megohms and was satisfactorily punched at 80° F. Additionally, the laminate was found to have a water absorption of .78 percent, as determined by the NEMA method.

In carrying out the process of the present invention it should be pointed out that the initial coat of a straight phenol-formaldehyde is preferably cured to almost the C stage in order to attain the highest electrical properties.

If this initial resin coat is not so cured, water of condensation and volatiles will be entrapped during the final laminating operation, thereby appreciably reducing the electrical properties of the finished product.

In order to achieve a preferred product using a filler sheet formed from cotton linters, the initial impregnation of phenol-formaldehyde resin should be sufficient to give a phenol-formaldehyde content of about 20 percent, based on the total weight of paper and phenol-formaldehyde resin. The second coating operation should apply sufficient cresylic acid-formaldehyde polyamide blend to give a final total resin content of about 55 percent or above, based on the total weight of filler and resin.

The ability of a laminate to undergo fabrication or punching is determined primarily by a visual inspection. Thus, for a given die and at a given temperature, if upon being punched, the laminate breaks or chips or shows surface cracks, it is rejected as not having suitable punchability at the temperature designated. Laminates made in accordance with this invention can be easily fabricated at normal or room temperatures and have electrical properties equivalent to or better than those required for XXXP grades of laminate. The average minimum insulation resistance of the laminates produced by the method of this invention is 150,000 megohms and the moisture absorption is in general less than one percent.

While it has been indicated that the varnish disclosed herein is primarily directed to a use in making laminates, it should also be mentioned that it has certain advantages as an adhesive and, hence, may be used for example to form a bond between a metal foil and a base laminate. When using the varnish in this manner, certain changes may be made in the formulation outside the limits specified in connection with the manufacture of laminates. Thus, it may be appropriate to have higher percentages of phenol and/or formaldehyde to provide a faster cure, normally a disadvantage when making a fibrous laminate.

Having described certain exemplary embodiments of the invention, what I desire to claim is:

1. A laminate capable of being fabricated at a temperature of about 75–80° F. without noticeable creation of cracks or chips comprising a plurality of super-imposed filler sheets impregnated with a heat and pressure hardened composition comprising a cresylic acid-formaldehyde resin formed from a cresylic acid containing at least 30 percent m-cresol, and a polyamide derived from a polymeric fatty acid and a polyamine, the polyamide comprising 55–70 percent by weight of said composition.

2. A laminate as described in claim 1 wherein said polyamide is the reaction product of ethylene diamine and dilinoleic acid.

3. A laminate capable of being fabricated at a temperature of about 75–80° F. without noticeable creation of cracks or chips comprising a plurality of superimposed filler sheets whose fibers have a high degree of porosity and capillarity, each of said sheets being initially impregnated with a phenol-formaldehyde resin and containing a second coat of cresylic acid-formaldehyde resin polyamide blend wherein said cresylic acid contains at least 30 percent m-cresol and said polyamide comprises 55–70 percent of said blend and is derived from a polymeric fatty acid and a polyamine; said resins being cured to a hardened state under heat and pressure, thereby forming a continuous resin binder.

4. A laminate as described in claim 3 wherein the filler sheets are composed of cellulosic fibers, the initial coat of phenol-formaldehyde resin comprises about 20 percent of the combined weight of phenol-formaldehyde resin and filler, and the final resin content including the cresylic acid-formaldehyde resin polyamide blend comprises at least 55 percent of the total weight of filler and resin.

5. A laminate as described in claim 4 wherein said polyamide is the reaction product of ethylene diamine and dilinoleic acid.

6. A laminate capable of being fabricated at a temperature between 75–110° F. without noticeable creation of cracks or chips comprising a fibrous base material whose fibers are characterized by high porosity and capillarity, said base material containing an initial coat of phenol-formaldehyde resin and a second coat comprising a blend of cresylic acid-formaldehyde resin with a polyamide derived from a polymeric fatty acid and a polyamine, said cresylic acid containing at least 30 percent m-cresol and said polyamide comprising at least fifty percent of said blend, the whole being bonded together as an integral unit under heat and pressure.

7. In a process of making a laminate including the steps of impregnating a base sheet with a composition comprising a cresylic acid formaldehyde resin blended with from 55 to 70 percent of a polyamide derived from a polymeric fatty acid and a polyamine, said cresylic acid formaldehyde resin formed from a cresylic acid containing at least 30 percent m-cresol; superimposing a plurality of said impregnated sheets to form a pile; and molding said pile under heat and pressure to cure said composition and form an integral board-like structure.

8. In a process of making a laminated article including the steps of initially impregnating a fibrous base sheet wherein the fibers of said sheet have a high degree of porosity and capillarity with a phenol-formaldehyde resin; coating said resin impregnated sheet with a second composition comprising a cresylic acid-formaldehyde resin blended with from 55 to 70 percent of a polyamide derived from a polymeric fatty acid and a polyamine, said cresylic acid containing at least 30 percent m-cresol; superimposing a plurality of impregnated sheets to form a pile; molding said pile under heat and pressure for a time sufficient to cure the resins and consolidate the resins and filler as an integral unit.

9. In a process of making a laminated article as described in claim 8 including the step of curing the initial phenol-formaldehyde resin after impregnation to just short of the C stage.

10. In a process of making a laminated article as described in claim 9 wherein said pile is molded under a pressure of approximately 1200 p.s.i. and at a temperature of between 300–320° F. for a period of about 90 minutes.

11. A hard, board-like product formed by molding under heat and pressure a cellulosic fiber filler initially impregnated with a resinous phenol-formaldehyde condensation product and subsequently impregnated with a second resinous composition comprising a polyamide derived from the reaction of ethylene diamine and dilinoleic acid and the condensation product of formaldehyde with a cresylic acid containing at least thirty percent m-cresol, the polyamide comprising between 55–70 percent by weight of the second resinous composition.

References Cited in the file of this patent

UNITED STATES PATENTS

| | | |
|---|---|---|
| 2,267,390 | Alexander | Dec. 23, 1941 |
| 2,271,233 | Smith et al. | Jan. 27, 1942 |
| 2,399,184 | Heckert | Apr. 30, 1946 |
| 2,542,484 | Debing et al. | Feb. 20, 1951 |
| 2,607,709 | Simpson et al. | Aug. 19, 1952 |
| 2,639,248 | Overholt | May 19, 1953 |
| 2,695,908 | Wittcoff | Nov. 30, 1954 |
| 2,891,023 | Peerman et al. | June 16, 1959 |